(12) United States Patent
Sirure et al.

(10) Patent No.: US 10,084,673 B1
(45) Date of Patent: Sep. 25, 2018

(54) NETWORK TEST SYSTEM, A SHAKEDOWN SERVER, AND A METHOD OF PERFORMING SITE ACCEPTANCE TESTING FOR A COMMUNICATIONS NETWORK SITE

(71) Applicant: Verveba Telecom LLC, Richardson, TX (US)

(72) Inventors: Gayatri Sirure, Richardson, TX (US); Manik Arora, Richardson, TX (US)

(73) Assignee: Verveba Telecom LLC, Richardson, TX (US)

( * ) Notice: Subject to any disclaimer, the term of this patent is extended or adjusted under 35 U.S.C. 154(b) by 0 days.

(21) Appl. No.: 15/590,746

(22) Filed: May 9, 2017

(51) Int. Cl.
*H04W 24/00* (2009.01)
*H04L 12/26* (2006.01)
*H04W 24/08* (2009.01)
*H01Q 3/26* (2006.01)

(52) U.S. Cl.
CPC ............ *H04L 43/04* (2013.01); *H01Q 3/267* (2013.01); *H04L 43/0817* (2013.01); *H04L 43/10* (2013.01); *H04L 43/50* (2013.01); *H04W 24/08* (2013.01)

(58) Field of Classification Search
CPC ..... H04L 43/04; H04L 43/0817; H04L 43/10; H04L 43/50; H04W 24/08; H04Q 3/267

USPC ......................................................... 455/423
See application file for complete search history.

(56) References Cited

U.S. PATENT DOCUMENTS

| | | | |
|---|---|---|---|
| 8,737,930 B2 * | 5/2014 | Sadana | H04W 28/24 455/67.7 |
| 2004/0259555 A1 * | 12/2004 | Rappaport | H04W 16/18 455/446 |
| 2014/0254405 A1 * | 9/2014 | Mellein | H04W 24/02 370/252 |
| 2015/0195737 A1 * | 7/2015 | Tabet | H04L 43/0888 455/405 |
| 2016/0260022 A1 * | 9/2016 | Yamada | H04W 4/029 |

* cited by examiner

*Primary Examiner* — William Nealon (57) ABSTRACT

A network test system, a method of performing site acceptance testing for a communications network site, and a computer program product for testing a communications network site are disclosed herein. In one embodiment, the network test system includes: (1) a mobile testing device configured to collect RF data from the communications network site and device location data corresponding to the RF data, and (2) a shakedown server configured to receive the RF data and device location data from the mobile testing device, derive depth data and spread data of each sector based on the RF data and device location data, and automatically determine a MIMO issue at the communications network site based on a comparison of the depth and spread data to pre-defined scenarios.

19 Claims, 4 Drawing Sheets

| Sector | PCI | Azimuth | Sector Swap | Cross Connect | MIMO |
|--------|-----|---------|-------------|---------------|------|
| A | 472 | 8 | NO | NO | NO |
| B | 471 | 128 | NO | NO | NO |
| C | 473 | 248 | NO | NO | NO |

400

FIG. 4 and the skill of the personnel. With the increasing number of network sites being installed to provide communications networks, a more efficient and effective manner of performing site acceptance testing is needed.

NETWORK TEST SYSTEM, A SHAKEDOWN SERVER, AND A METHOD OF PERFORMING SITE ACCEPTANCE TESTING FOR A COMMUNICATIONS NETWORK SITE

BACKGROUND

As the development of communication devices and applications that execute on these devices increase, so does the demand for bandwidth. Accordingly, wireless communication networks are becoming even more prevalent throughout the world to provide the necessary capacities for this continued growth. Installing or expanding wireless networks, however, is more than just placing an antenna on communication towers. Expanding the communication infrastructure requires careful design, construction, optimization and performance monitoring to ensure a reliable wireless communication network.

SUMMARY

In one aspect, the disclosure provides a network test system for performing site acceptance testing for a communications network site having sectors. In one embodiment, the network test system includes: (1) a mobile testing device configured to collect RF data from the communications network site and device location data corresponding to the RF data, and (2) a shakedown server configured to receive the RF data and device location data from the mobile testing device, derive depth data and spread data of each sector based on the RF data and device location data, and automatically determine a MIMO issue at the communications network site based on a comparison of the depth and spread data to pre-defined scenarios.

In another aspect the disclosure provides a method of performing site acceptance testing for a communications network site. In one embodiment, the method include: (1) collecting RF data and device location data by a mobile testing device during a test drive around the communications network site, (2) receiving the RF data, device location data, and site parameters of the communications network site at a shakedown server, and (3) automatically determining a MIMO status at the communications network site based on a comparison of the RF data, device location data, and site parameters to pre-defined scenarios for MIMO errors.

In yet another aspect, the disclosure provides a computer program product stored on a non-transitory computer readable medium that is configured to direct a processor of a mobile testing device to test a communications network site by performing a method. In one embodiment, the method includes: (1) locking the mobile testing device to a single channel of the communications network site, (2) collecting RF data from the communications network site and device location data corresponding to the RF data, and (3) sending the RF data and the device location data to a server configured to automatically determine a MIMO, a cross connect, or a sector swap issue at the communications network site based on the RF data and site parameters of the communications network site.

BRIEF DESCRIPTION

Reference is now made to the following descriptions taken in conjunction with the accompanying drawings, in which.

DETAILED DESCRIPTION

In addition to designing, constructing, optimizing, and monitoring a network site, integration and initial testing of the network site is also important to provide a reliable wireless communications network. Integration is connecting the network equipment at the constructed network site to the base transceiver station (BTS) at the network site. Integration includes terminating the antenna leads at the BTS. A skilled cell site integrator typically performs the integration after construction and before testing.

A BTS is communication equipment that facilitates wireless communication between the network equipment at the network site and user equipment (UE). BTS is a general term applicable to various wireless communication standards and includes a radio base station (RBS) or simply a base station (BS). BTS also includes the specific types of equipment used in the different types of networks, such as node B in 3G Networks or evolved node B (eNB) for the LTE standard networks.

A base station controller (BSC) controls and supervises the radio resources in a BTS. Together with BTS, the BSC forms a base station system (BSS), responsible for the management and cell configuration data in the radio network.

After integration, initial testing of the site is conducted to verify the design, construction, and integration. One type of testing after construction is referred to as shakedown testing. Shakedown testing, also known as site acceptance testing, is testing of a cell site that occurs before a site is handed over to a carrier's operations team but after construction and installation work at the network site.

Shakedown testing typically focuses on functional, also known as stationary testing, and mobility testing to ensure basic capabilities at a site are operational. Functional testing focuses on voice and data tests performed in each sector of the cell, close to the site. Tests ensure not only that a device connects to the proper sector, but also assess fallback mechanisms to make sure that fallback to, for example, circuit-switched voice and 3G data sessions, work properly. Mobility testing ensures that handovers between the sectors at the site are happening properly, with a low degree of latency. The handovers are tested in both directions around the site across all three of the sectors: sector A to B, B to C, C to A, A to C, C to B, and B to A.

Various problems can occur during integration, such as, improperly connecting the correct phases of the antenna to the correct phases at the BTS. The site acceptance testing is performed to discover any possible connection issues at the site. Currently, however, site acceptance testing requires skilled personnel, such as integrators, RF engineers, drive testers, etc., and can last up to three days depending on the connection issues.

Advantageously, the disclosure provides a network testing system, method, and apparatus that can reduce the time required for site acceptance testing. In some instances, the time for the site acceptance testing can be reduced to approximately ninety minutes. Additionally, instead of requiring multiple personnel including a highly skilled RF engineer, the disclosed testing scheme allows a single field technician, such as an integrator, to perform the testing employing intelligent and simplified testing gear. Thus, instead of requiring a field technician, a drive tester, and an RF engineer, in addition to a laptop with multiple UE connected, the disclosed testing can be performed in the field, for example, by a single integrator employing a mobile testing device as disclosed herein.

Figure 1:
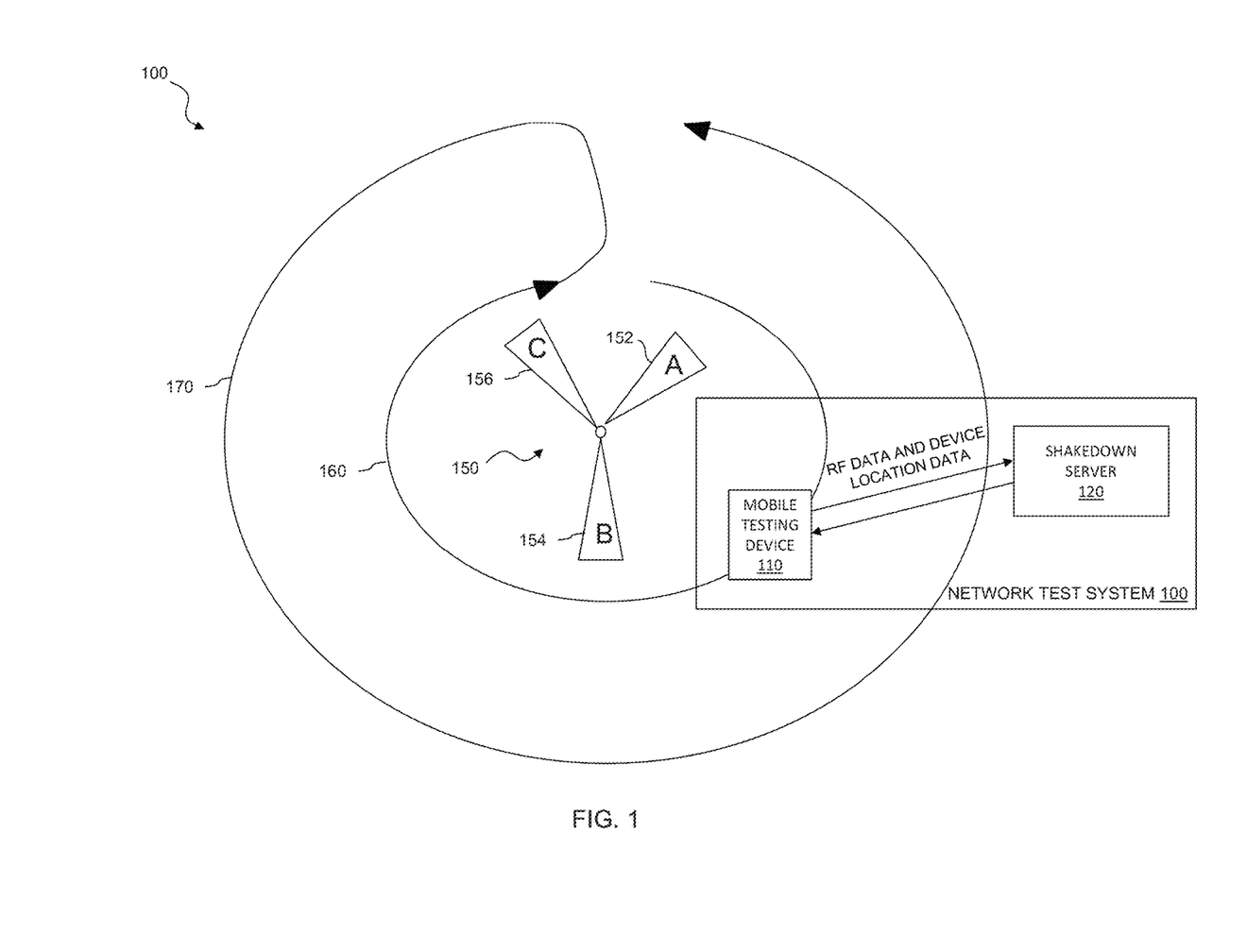
FIG. 1 illustrates a diagram of an embodiment of a network testing system constructed according to the principles of the disclosure and located in the environment of a network site.

Turning now to the Figures, FIG. 1 illustrates an embodiment of a network test system 100, constructed according to the principles of the disclosure, located in a testing environment of a communications network site 150. The communications network site 150 has been constructed and integrated and is ready for site acceptance testing. In some embodiments, the communications network site 150 includes the necessary equipment to communicate according to multiple communications standards, such as 3G and LTE. The communications network site 150 can be a cellular structure including antennas and electronic communications equipment. For example, the communications network site 150 can be a conventional cell site such as a lattice tower, a monopole tower, a guyed tower, a stealth tower, a water tower, or a rooftop. The communications network site 150 can include antennas and communications equipment for multiple cellular standards, such as, Global System for Mobile Communications (GSM), Wideband Code Division Multiple Access (WCDMA), and Long Term Evolution (LTE), of various wireless technology generations, such as, 2G, 3G, and 4G. Within each cellular standard, the communications network site 150 can communicate on multiple bands over different channels, wherein each of the channels corresponds to a particular carrier. For example, the communications network site 150 can include the necessary antennas and communications equipment to provide 4G wireless communication according to the LTE standard over two frequency bands that each has three communication channels. The communications network site 150 includes multiple sectors, typically three, for communication. In FIG. 1, three sectors, sector A 152, sector B 154, and sector C 156, are illustrated.

The network test system 100 is employed to perform the site acceptance testing for the communications network site 150. The network test system 100 includes a mobile testing device 110 and a shakedown server 120. For the site acceptance testing, the mobile test device 110 is taken around the communications network site 150 in a clockwise and counterclockwise direction to collect network data therefrom. Clockwise path 160 and counterclockwise path 170 illustrate the route in which the mobile testing device 110 follows for the site acceptance testing. Typically, the mobile test device 110 is located in a vehicle and driven along the clockwise path 160 and the counterclockwise path 170 for the site acceptance testing. The mobile testing device 110 is configured to test a single channel at a time and is "locked" to the single channel (or technology depending on the number of channels for a technology) for testing of the communications network site 150. Testing of a single channel is sufficient to determine connection issues for that channel at the communications network site 150. More than one channel, including all of the channels of the communication network site 150, can be tested to verify proper operation. The number of channels to test can be determined by the operator of the communications network site 150 or by the individual carriers of each channel based on such factors as cost and location. "Locked" as used herein is defined as being configured or set to communicate over a single, desired communications channel. In some embodiments, multiple mobile testing devices that are locked to different channels can be used to simultaneously check the different channels of the communications network site 150, i.e., simultaneously driven along the clockwise path 160 and the counterclockwise path 170. The mobile testing device 110 can also be unlocked from the single channel after testing and locked to another channel for testing of the new channel. Thus, the mobile testing device 110 can be reprogrammed or reconfigured to test more than one channel at different times, i.e., different passes along the clockwise path 160 and the counterclockwise path 170. Locking and unlocking of the mobile testing device 110 can be controlled by the mobile testing device 110 and can be according to the desire or instructions received by the tester.

The mobile testing device 110 is a wireless communication and computing device capable of both voice and data communication. The mobile testing device 110 can be UE as defined according to the UMTS and LTE standards. The mobile testing device 110 can be, for example, a smartphone, or a computing device, such as a tablet, pad, or laptop, that has a mobile broadband adapter or another device for communicating with the communications network site 150.

The mobile testing device 110 is configured to collect RF data from the communications network site 150 and device location data corresponding to the mobile testing device 110 when traversing the clockwise path 160 and the counterclockwise path 170 around the communications network site 150. The device location data can be geographical data collected from a Global Positioning System (GPS) device of the mobile testing device 110. The device location data can be stored in a data table. Typically the device location data is stored a csv format. The device location data includes latitude and longitude coordinates of the mobile testing device 110 as it traverses along the clockwise path 160 and the counterclockwise path 170 collecting the RF data. The device location data collected by the mobile testing device 110 also includes time stamps for the respective latitude and longitude coordinates. In one embodiment, the mobile testing device 110 collects the device location data every second.

The mobile testing device 110 can collect the RF data from a modem thereof that communicates with the communications network site 150 when traversing the clockwise and counterclockwise paths 160, 170. The RF data collected by the mobile testing device 110 includes physical cell ID (PCI) of the communications network site 150, cell ID of the communications network site 150, reference signal received power (RSRP), and transport block (TB) stream size 0 (TB0) and 1 (TB1). A cell ID is used to uniquely identify the BTS (such as an eNB) within a network. The PCI is the identifier of a cell in the physical layer of the LTE network, which is used for separation of different transmitters. The RF data described above corresponds to a cellular standard, LTE, of 4G technology generation. For other standards or technology generations, corresponding RF data can be collected by the mobile testing device 110 for testing by the network test system 100. For example, for the mobile testing device 110 to distinguish signals from different 3G cells using UMTS, a primary scrambling code (PSC) can be collected instead of PCI as a local cell identifier. As such, the RF data collected or at least some of the RF data collected can depend on the technology and/or communication standard employed.

The mobile testing device 110 collects the RF data per each millisecond and saves the collected information, such as logs in a .qmdl format. Other formats, including proprietary formats, can be used. After the mobile testing device 110 completes the collection of the RF data and device location data along the clockwise and counterclockwise paths 160, 170, the mobile testing device 110 sends both the RF data and the device location data to the shakedown server 120. The mobile communication device 110 can send the RF data and the device location data via a conventional upload of data to the shakedown server 120.

The mobile testing device 110 includes a processor, a memory, a display, and other components that can be typically found with mobile computing devices. The above described portion of testing and reporting performed by the mobile testing device 110 can be directed by a computer program product stored on the memory of the mobile testing device 110 that directs the processor thereof. In one embodiment, the mobile testing device 110 includes a computer program product stored on a non-transitory computer readable medium, the memory thereof, that is configured to direct the processor thereof to test a communications network site by performing a method including: locking the mobile testing device to a single channel of the communications network site, collecting RF data from the communications network site and device location data corresponding to the RF data, and sending the RF data and the device location data to the shakedown server 120 that is configured to automatically determine a MIMO, a cross connect, or a sector swap issue at the communications network site 150 based at least on the RF data and site parameters of the communications network site 150.

The shakedown server 120 is a computing device having a memory, a processor, and an interface for receiving and transmitting data. The shakedown server 120 can include conventional components or hardware typically included on a server that is configured to communicate via a communications network such as the Internet. The processor or processors of the shakedown server 120 include hardware, software or a combination thereof to provide the necessary functionality of a server, such as a conventional server. The shakedown server 120 can include additional components that are typically included in a server.

The shakedown server 120 is configured to receive the RF data and the device location data via the interface from the mobile testing device 110. Additionally, the shakedown server 120 is configured to process the RF data, the device location data, and site parameters of the communications network site 150 to derive depth data and spread data of each of the sectors, sector A 152, sector B 154, and sector C 156. The shakedown server 120 is further configured to automatically determine if a cross connect, a multiple input multiple output (MIMO), or a sector swap issue exists at the communications network site 150 based on a comparison of the depth and spread data to pre-defined scenarios.

The sector swap, cross connect and MIMO issues discussed herein are recognized in the industry and known by one skilled in the art. For example, the term sector swap is used to describe the problem that arises when the cables for a sector are connected to the antennas of the other sectors. For example Sector A is connected to Sector B. A cross connect issue occurs when one feeder (i.e., one feeder out of two or more) of a sector is connected to an antenna of another sector. A MIMO issue arises at a site when the MIMO configurations on the site are not correctly implemented.

Figure 4:
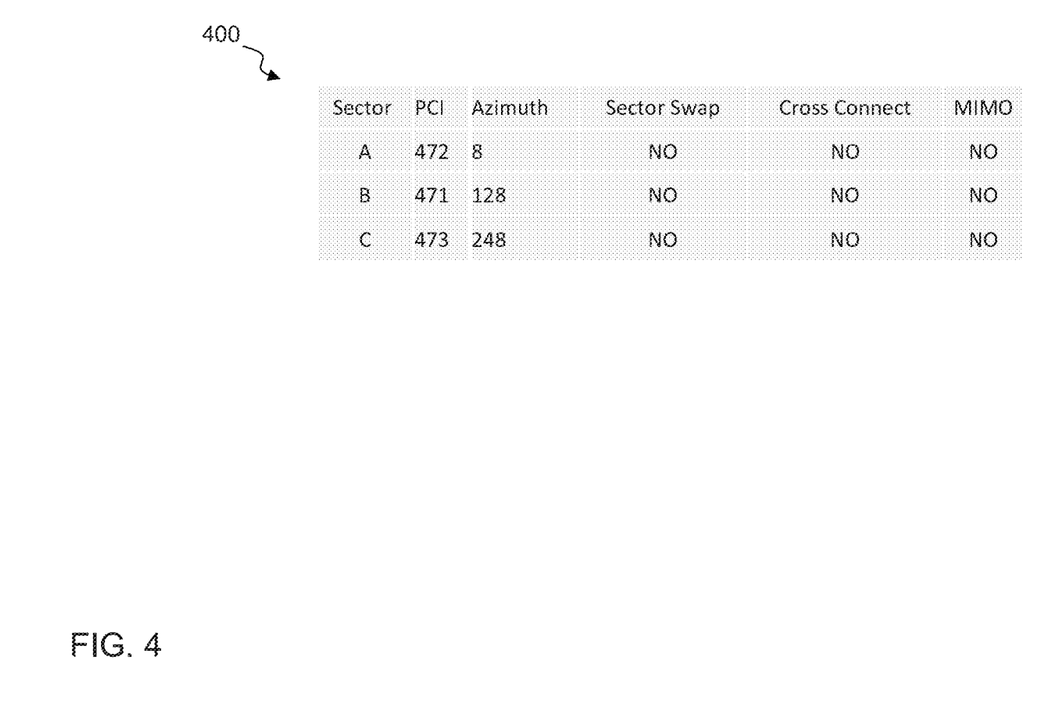
FIG. 4 provides an example of results generated by a shakedown server and provided to a mobile testing device.

The shakedown server 120 is also configured to send the results of the determination to the mobile testing device 110. The shakedown server 120 can send the results via conventional means. In one embodiment, the results are presented in a tabular form on a display of the mobile testing device 110, such as illustrated in FIG. 4.

Figure 2:
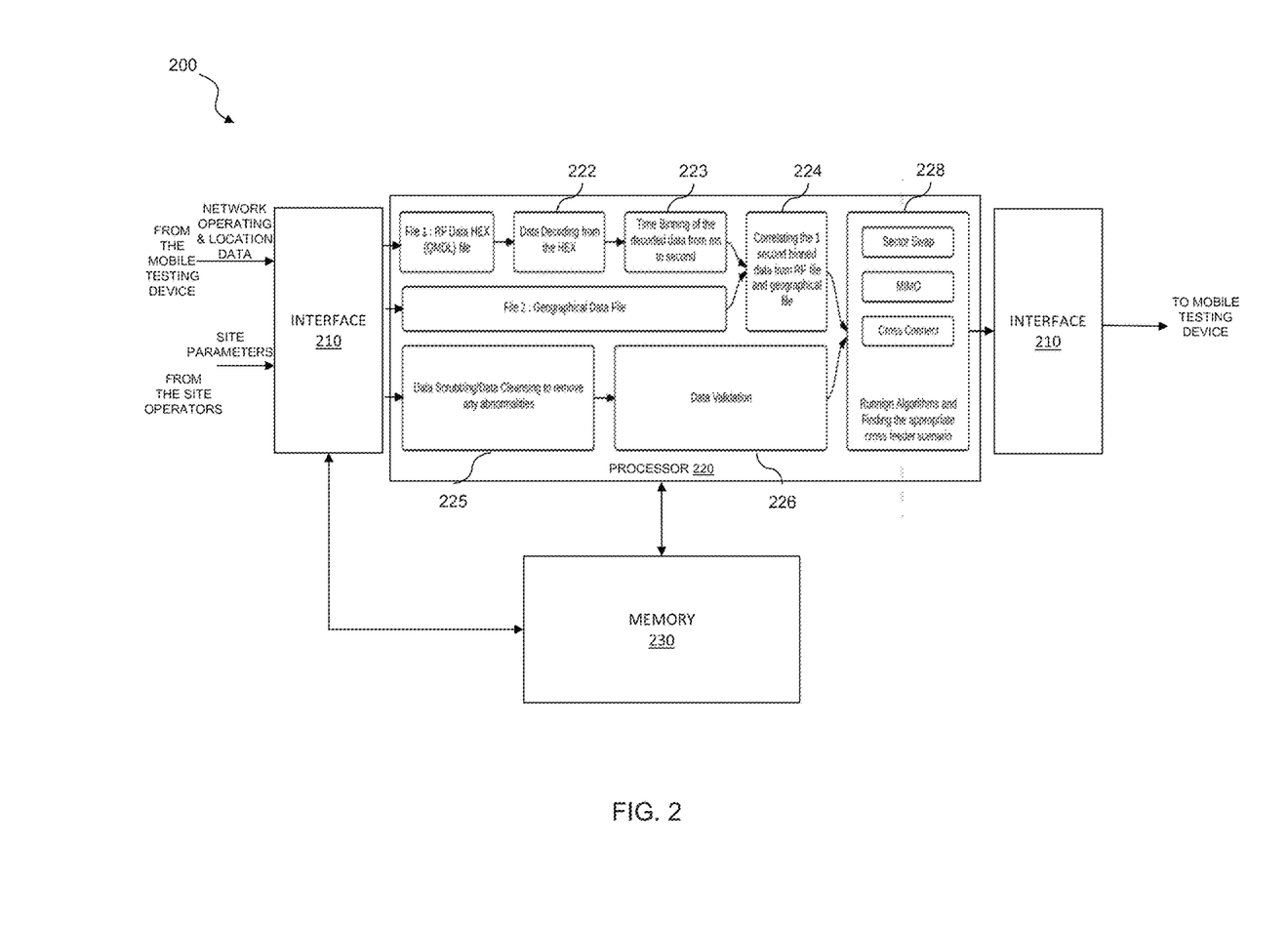
FIG. 2 illustrates a block diagram of an embodiment of a shakedown server constructed according to the principles of the disclosure.

FIG. 2 illustrates a block diagram of an embodiment of a shakedown server 200 constructed according to the principles of the disclosure. The shakedown server 120 of FIG. 1 can be constructed and configured as the shakedown server 200. The shakedown server 200 includes an interface 210, a processor 220, and a memory 230. The shakedown server 200 can include additional circuitry or components typically included in a conventional server.

The interface 210 is configured to transmit and receive data. The interface 210 can be a conventional interface typical to a server connected to the Internet or other communications networks. The interface 210 is configured to receive RF data and device location data from a mobile testing device, such as the mobile testing device 110. The interface 210 is also configured to receive site parameters of a communications network site, such as the communications network site 150. As such, the interface 210 includes the necessary ports and circuitry to transmit and receive this type of data and information over various communication mediums. As illustrated in FIG. 2, the site parameters can be received from an operator or original equipment manufacturer (OEM) of the communications network site that is being tested. The site parameters include network design configurations for the test site and includes sector azimuths, sector beam widths, sector PCIs, Cell ID of the communications network site, and site location data. The site location data includes the latitude and longitude coordinates of the communications network site. The site parameters can be organized in a spreadsheet and loaded into the interface 210. In one embodiment, the site parameters are stored in an Excel file. The site parameters can be obtained from design data or operation support subsystem (OSS).

The processor 220 is configured to automatically determine if there is a cross connect, MIMO, or sector swap issue at a communications network site and provide the determined results to the interface 210. The processor 220 includes a data decoder 222, a time binning engine 223, a data organizer 224, a data scrubbing engine 225, a data validator 226, and an integration error detector 228.

The data decoder 222 receives the RF data via the interface 210 and decodes the RF data for further processing. The RF data is typically received in HEX file, such as in a QMDL format, and the data decoder 222 decodes or translates the RF data into a human readable form, such as text. The RF data can be stored and received in data formats, including proprietary formats. The decoded data can be stored in the memory 230 for further processing.

The time binning engine 223 is configured to parse the RF data after decoding and bin the parsed data. Since the RF data can be collected over a different rate, it is converted to the same collection rate of the device location data so that it can be used together. Parsing can be done by comparing a set of hex strings with that of the data and extracting the information in a tabular format. After the parsing, the time binning engine 223 completes the time binning process on the data. In this process, the data for the milliseconds of a particular second are weighted and the calculated values with appropriate mathematical equations is assigned to that second of the test. For example, as per LTE frame structure, the RF data can be captured every millisecond for the data transfer and the device location data can be collected every second. The parsed RF data is time-binned by the time binning engine 223 into seconds for use with the device location data. Thus, for example, the time binning engine 223 is configured to bin the RF millisecond data into second's data. In one embodiment, the time binning engine 223 can generate a second's table of the time-binned RF data and send it to the memory 230 for storage.

The data organizer 224 is configured to merge the RF data with the device location data employing the time-binned RF data generated by the time binning engine 223. In one embodiment, the data organizer 224 combines the device location data and the time-binned RF data to generate a merged RF and device location table having time stamps with the corresponding RF data and device location data. The merged time-binned RF and device location data, such as stored in the merged RF and device location table, can be further employed by the processor 220 (such as by the integration error detector 228) for calculating the angles of each of the mobility points, i.e., the angle between the locations (e.g., longitude and latitude coordinates) where the mobile testing device collected the RF data with respect to the site location data (e.g., longitude and latitude coordinates) of the communications network site.

For example, the data organizer 224 can combine the second's table and the table of device location data to form a merged RF and device location table by matching the time stamps from both of the tables and extracting the matching latitude and longitude coordinates for every second. Once the data is combined, the angles for each of the mobility points can be calculated. In some instances, there might be scenarios when the time stamps do not match. During these instances, the geographical data of the device location data can be backfilled by taking samples from the previous closest entry.

The data scrubbing engine 225 is configured to receive the site parameters and scrub/cleanse the data to remove abnormalities and maintain data sanity since the site parameters can be obtained from various sources. Additionally, the data validator 226 verifies the accuracy of the cleansed, site parameters before further processing. The data scrubbing engine 225 and the data validator 226 can perform these functions through MySQL queries that have been developed to test for special cases or known conditions. For example, a PCI cannot be greater than 503. As such, a query can be used to check for any PCIs that are greater than 503. Additionally, a communication standard may require a particular naming convention for sites. As such, a query can be used to verify compliance with the standard's requirements. Identified anomalies can then be corrected before further processing.

The integration error detector 228 is configured to determine incorrect connections between the antenna connections at the communications network site and the BTS. The integration error detector 228 is configured to derive depth data and spread data of each sector of a communications network site based on the RF data, the device location data, and the site parameters. Additionally, the integration error detector 228 is configured to automatically determine a sector swap, MIMO, and cross connect issues at the communications network site based on a comparison of the depth and spread data to pre-defined scenarios. The pre-defined scenarios are specific for each different integration error. In other words, there are a unique set of pre-defined scenarios for sector swaps, a unique set of pre-defined scenarios for MIMO issues, and a unique set of pre-defined scenarios for cross connects. In one embodiment, the integration error detector 228 is configured to operate as described below.

Employing the merged RF and device location data from the data organizer 224, such as stored in a merged RF and device location table, the integration error detector 228 performs an angle binning process to consolidate all mobility points which have duplicate entries of a same angle. In this manner, the integration error detector 228 determines unique angles for each respective PCI from the RF data by consolidating multiple entries for a single PCI. The integration error detector 228 can generate an angle output table having the unique angles. Determining the unique angles ensures that for a given PCI the maximum number of entries is 360. In one embodiment, the integration error detector 228 filters the data on a PCI basis and then the first PCI is binned on the basis of the angle to effectively remove multiple entries for the same angle. The same process is repeated for all the PCIs for a particular communications network site. Once the binning is done, the binned data can be stored in a tabular format.

The integration error detector 228 is further configured to calculate the number of mobility points which lie in a given sector region. The determined number of mobility points per sector region can be stored in a tabular form that represents the RF data collected in a statistical format. In one embodiment, the integration error detector 228 determines the number of mobility points within a region by employing the binned data and calculating the ranges of each sector region based on the azimuth and beam width of each sector. In some embodiments, the integration error detector 228 employs six sector regions and determines the ranges for each of the sector regions based on the azimuth and beam width from the site parameters.

For example, Table 1 represents site parameters for a communications network site ABCD1234. Table 1 includes the PCI, azimuth and beam width for sectors A, B, and C of the ABCD1234 site.

TABLE 1

| Site Parameters for ABCD1234 | | | |
| --- | --- | --- | --- |
| Site ID | PCI | Azimuth | Beamwidth |
| ABCD1234 | 1 | 0 | 60 |
| ABCD1234 | 2 | 120 | 60 |
| ABCD1234 | 3 | 240 | 60 |

The integration error detector 228 calculates the ranges using the following formulas considering 360 degrees around the communications network site ABCD1234:

$$\text{Starting Sector Beamwidth} = \text{Sector Azimuth}-(\text{Sector Beamwidth}/2)$$

$$\text{Ending Sector Beamwidth} = \text{Sector Azimuth}+(\text{Beamwidth}/2)$$

Thus, for sector A (with PCI 1), the starting beam width is, 0−(60/2)=−30=330, and the ending beam width is, 0+(60/2)=30, for a range of sector A=[330, 30]. In a similar fashion, the integration error detector 228 can calculate the other ranges for the sector regions as represented by Table 2 below.

TABLE 2

Calculated Ranges for the Sector Regions

| A Range | A-B Range | B Range | B-C Range | C Range | C-A Range |
|---|---|---|---|---|---|
| 330-30 | 30-90 | 90-150 | 150-210 | 210-270 | 270-330 |

Once the ranges are computed, the integration error detector 228 correlates the binned data into the determined sector region ranges according to a PCI criteria and a MIMO criteria. For the PCI criteria, the PCI information from the binned data is placed in the corresponding sector region. For the MIMO criteria the TB0 and TB1 information (MIMO data) from the binned data is placed in the corresponding sector region. Tables 3 and 4 below provide examples of the PCI data distributed across the different sector regions (Table 3) and the MIMO data distributed across the different sector regions (Table 4).

TABLE 3

PCI data split into the different sector regions

| Site ID | Sector | PCI | Azimuth | A beamwidth | Between A and B | B beamwidth | Between B and C | C beamwidth | Between C and A | Horizontal Sum |
|---|---|---|---|---|---|---|---|---|---|---|
| ABCD1234 | A | 1 | 0 | 45 | 30 | 0 | 0 | 5 | 25 | 105 |
| ABCD1234 | B | 2 | 120 | 0 | 138 | 34 | 0 | 0 | 0 | 172 |
| ABCD1234 | C | 3 | 240 | 0 | 0 | 25 | 155 | 93 | 0 | 273 |
| Vertical Sum | | | | 45 | 168 | 59 | 155 | 98 | 25 | 550 |

TABLE 4

MIMO data split into the different sector regions

| Site ID | Sector | PCI | Azimuth | A beamwidth | Between A and B | B beamwidth | Between B and C | C beamwidth | Between C and A | Horizontal Sum |
|---|---|---|---|---|---|---|---|---|---|---|
| ABCD1234 | A | 1 | 0 | 0 | 0 | 0 | 103 | 164 | 31 | 298 |
| ABCD1234 | B | 2 | 120 | 92 | 3 | 0 | 0 | 0 | 7 | 102 |
| ABCD1234 | C | 3 | 240 | 0 | 14 | 53 | 71 | 0 | 0 | 138 |
| Vertical Sum | | | | 92 | 17 | 53 | 174 | 164 | 38 | |

The integration error detector 228 also computes the spread of each PCI and the MIMO data over the different regions and the depth of each region. The spread and depth provide an understanding of the coverage of each PCI and the MIMO values of the PCI in all directions and an understanding of which PCIs are serving in what regions, respectively. In one embodiment, the integration error detector 228 places the spread analysis data in a tabular format employing Horizontal Normalization and places the depth analysis data in a tabular format employing Vertical Normalization. Tables 5 and 6 below represent the spread analysis for the PCI and MIMO data from Tables 3 and 4, respectively. Tables 7 and 8 represent the vertical spread analysis for the PCI and MIMO data from Tables 3 and 4, respectively.

For example, the integration error detector 228 performs spread analysis by calculating the percentage of a sector PCI in a beam width by dividing the count of the PCI in the beam width by the horizontal total of the sector PCI count. Thus, based on Table 3:

PCI1 for $A$ Beamwidth %=(Count of PCI1 for $A$ Beamwidth)/Total count of PCI1=(45/45+5+25+30)=(45/105)=42.85~42.9

In a similar fashion all the other 35 variables of Table 5 and Table 6 can be calculated.

TABLE 5

PCI Spread Analysis

| Site ID | Sector | PCI | Azimuth | A beamwidth | Between A and B | B beamwidth | Between B and C | C beamwidth | Between C and A |
|---|---|---|---|---|---|---|---|---|---|
| ABCD1234 | A | 1 | 0 | 42.9% | 28.6% | 0.0% | 0.0% | 4.8% | 23.8% |
| ABCD1234 | B | 2 | 120 | 0.0% | 80.2% | 19.8% | 0.0% | 0.0% | 0.0% |
| ABCD1234 | C | 3 | 240 | 0.0% | 0.0% | 9.2% | 56.8% | 34.1% | 0.0% |

TABLE 6

MIMO Spread Analysis

| Site ID | Sector | PCI | Azimuth | A beamwidth | Between A and B | B beamwidth | Between B and C | C beamwidth | Between C and A |
|---|---|---|---|---|---|---|---|---|---|
| ABCD1234 | A | 1 | 0 | 0.0% | 0.0% | 0.0% | 34.6% | 55.0% | 10.4% |
| ABCD1234 | B | 2 | 120 | 90.2% | 2.9% | 0.0% | 0.0% | 0.0% | 6.9% |
| ABCD1234 | C | 3 | 240 | 0.0% | 10.1% | 38.4% | 51.4% | 0.0% | 0.0% |

The integration error detector 228 performs the depth analysis to determine how many samples of each PCI and the MIMO data associated therewith show up within the given ranges. The integration error detector 228 can perform the depth analysis represented in Tables 7 and 8 in a similar fashion as described above for Tables 5 and 6 using the vertical sums from Tables 3 and 4 instead of the horizontal sums.

TABLE 7

PCI Depth Analysis

| Site ID | Sector | PCI | Azimuth | A beamwidth | Between A and B | B beamwidth | Between B and C | C beamwidth | Between C and A |
|---|---|---|---|---|---|---|---|---|---|
| ABCD1234 | A | 1 | 0 | 100.0% | 17.9% | 0.0% | 0.0% | 5.1% | 100.0% |
| ABCD1234 | B | 2 | 120 | 0.0% | 82.1% | 57.6% | 0.0% | 0.0% | 0.0% |
| ABCD1234 | C | 3 | 240 | 0.0% | 0.0% | 42.4% | 100.0% | 94.9% | 0.0% |

TABLE 8

MIMO Depth Analysis

| Site ID | Sector | PCI | Azimuth | A beamwidth | Between A and B | B beamwidth | Between B and C | C beamwidth | Between C and A |
|---|---|---|---|---|---|---|---|---|---|
| ABCD1234 | A | 1 | 0 | 0.0% | 0.0% | 0.0% | 59.2% | 100.0% | 81.6% |
| ABCD1234 | B | 2 | 120 | 100.0% | 17.6% | 0.0% | 0.0% | 0.0% | 18.4% |
| ABCD1234 | C | 3 | 240 | 0.0% | 82.4% | 100.0% | 40.8% | 0.0% | 0.0% |

Employing the generated depth data and spread data, such as from Tables 5-8, the integration error detector 228 automatically determines integration connection error by comparing the depth and spread data to unique pre-determined scenarios for each type of error. In one embodiment, there are eight pre-determined scenarios corresponding to a sector swap, two pre-determined scenarios corresponding to a MIMO issue per sector, and six pre-determined scenarios corresponding to a cross-connect. The pre-determined scenarios are based on empirical data from multiple communications network sites and include thresholds for at least some of the spread and depth data for comparison. Each of the pre-determined scenarios can have different thresholds that are established for comparison to different data elements of the spread and depth data. Based on these comparisons the integration error detector 228 can determine if various connection errors exist for each of the different phases of a communications network site.

Considering MIMO errors as an example, in one embodiment the integration error detector 228 compares at least some of the spread and depth data element values to thresholds of a pre-determined scenario that corresponds to a communications network site that has a MIMO error but no cross connect or sector swap error. For this scenario, twelve thresholds are established for comparison to different data elements that are denoted in Tables 5-8. In this embodiment, each of the thresholds is 50% for the denoted data elements of Tables 5-6, which are the A beamwidth of sector A, the B beamwidth of sector B, and the C beamwidth of sector C data elements, and the integration error detector 228 determines if the denoted data elements are greater than 50%. For the denoted data elements of Tables 7-8, which are the A beamwidth of sector A, the B beamwidth of sector B, and the C beamwidth of sector C data elements, each of the thresholds is 15% and the integration error detector 228 determines if the denoted data elements are greater than 15%. If so for each comparison, then the pre-determined scenario is satisfied and no MIMO issue exists at the communications network site.

In some embodiments, the integration error detector 228 converts a positive threshold comparison to a "1" for comparison to determine if a predetermined scenario is met. Thus a string of "1"s and "0"s in a designated order can represent a scenario and can be compared to the string of a "1"s and "0"s from the threshold comparisons. Continuing the above example, there are 72 data elements from Tables 5-8 and 12 of them are used for the above scenario. The stored data string corresponding to the scenario would have 72 ordered digits with 12 being a "1" and the rest being a "0."

The integration error detector 228 is configured to send the results of the comparison as a status report to the mobile testing device for viewing. The results are sent to the mobile testing device in a format recognized thereby, such as a conventional format used by smartphones. Additionally, the result can be shown at the shakedown server 200 in a tabular and map format. The results can be represented in stored display tables that correspond to the pre-determined scenarios. For example, FIG. 4 illustrates an example of a pre-stored display table 400 that corresponds to the above scenario that has no sector swap, cross connect or MIMO issues.

In various embodiments, the data elements that are employed for comparison correspond to the unique predetermined scenarios for the different antenna error or issues being determined. In some pre-determined scenarios, multiple data elements of the spread and depth data may be combined and compared to a threshold to determine compliance with the scenario. Additionally, the threshold values, the comparator (e.g., less than, greater than), and the number of data elements and thresholds used for comparison can vary depending on the pre-determined scenario. In some embodiments, the threshold values of the pre-determined scenarios can vary for different operators.

The memory 230 is configured to store the series of operating instructions that direct the operation of the processor 220 when executed to perform the procedures of functions described herein. The memory 230 can be configured as a conventional memory that stores code corresponding to the algorithms that provide the disclosed functions. The memory 230 can also store the various tables that are disclosed herein.

Figure 3:
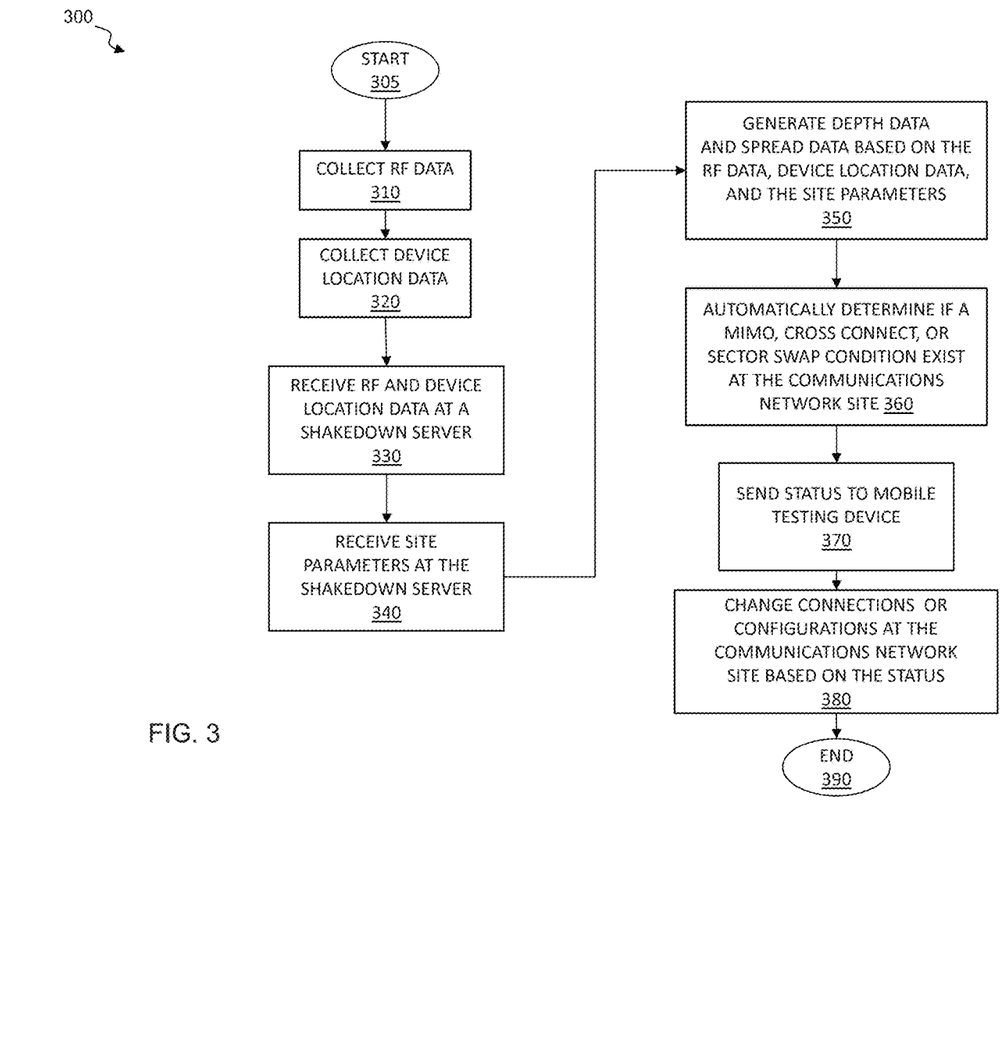
FIG. 3 illustrates a flow diagram of an embodiment of a method of performing site acceptance testing as carried out according to the principles of the disclosure.

FIG. 3 illustrates a flow diagram of an embodiment of a method 300 of performing site acceptance testing as carried out according to the principles of the disclosure. The method 300 can be carried out by a mobile testing device and a shakedown server as disclosed herein. The method 300 or at least some of the steps of the method 300 correspond to an algorithm derived to determine connection issues using pre-determined scenarios. The method 300 begins in a step 305.

In a step 310, RF data associated with a communication network site is collected. The RF data can be collected by a mobile testing device as it traverses a clockwise path and a counterclockwise path around the communication network site. The RF data can be associated with a single channel of the communications network site. As such, the mobile testing device can be locked to the single channel for collecting the RF data.

In one embodiment, the parameters of the RF data that are collected include the Time Stamps, Serving Cell PCI, RSRP of the Serving Cell, CINR of the Serving Cell, RSRQ of the Serving Cell, and transport block information. These parameters can be logged on millisecond basis, stored as a generic Qualcomm files (.qmdl), and compressed for a future upload to a shakedown server. The RF data collected depends on the communication technology and standard that is being used for testing.

In a step 320, device location data is collected. The device location data corresponds to the mobility points in which the RF data is collected. The RF data and the device location data can be collected simultaneously by the mobile testing device. The device location data collected can be the geographical coordinates of the mobility testing device during test drive and can begin as soon as the test is started. The parameters of the device location data include the Time Stamp of the Test drive, Latitude/Longitude of the mobility points and the Serving Cell PCI. The device location data is collected every second and this goes on until the end of the test.

The RF data and the device location data are received by a shakedown server in a step 330. The mobile testing device can send the RF and device location data to the shakedown server. The shakedown server can receive the RF data and device location data via a conventional communications network.

The shakedown server receives site parameters of the communications network site in a step 340. The shakedown server can receive the site parameters via an uploaded. The shakedown server can also receive the site parameters via another type of conventional data transfer.

In a step 350, the shakedown server generates depth data and spread data for sectors of the communications network site based on the RF data, the device location data, and the site parameters.

In a step 360, the shakedown server automatically determines if a cross connect, a MIMO, or a sector swap condition exist at the communications network site based on a comparison of the depth data and the spread data to pre-defined scenarios. In one embodiment, the shakedown server employs device location data, cell ID, PCI, and transport block data from the RF data, and site location data, sector azimuth, sector beam width, and PCI data from site parameters to determine a MIMO issue. For a cross connect issue, the shakedown server can employ device location data, cell ID, PCI, and transport block data of the RF data, site location data, sector azimuth, sector beam width, and PCI data from site parameters to determine cross connect issues. The shakedown server can determine a sector swap at the communications network site based on site location data, sector azimuth, sector beam width, and PCI data from site parameters, and device location data, cell ID, and PCI data from the RF data.

In a step 370, the shakedown server sends a status report of MIMO, cross connect, or sector swap conditions to the mobile testing device. The status report is based on the results of the comparison in step 360. The status report can be presented on a display of the mobile testing device as an easy to read table. FIG. 4 provides an example. In some embodiments, the status report can also be sent to other devices in addition to or instead of the mobile testing device. For example, the status report can also be sent to an operator of the communications network site, a testing coordinator, carriers associated with the communications network site, or any combination of these or other designated parties.

In a step 380, the connections or configurations at the communications network site are changed based on the status report. In some embodiments, the tester can review the connections between the antenna and a BTS at the communications network site and make the needed changes based on the status report to correct a sector swap, a cross connect, or a MIMO issue. Additionally, the tester can seek OSS support to rectify the issues. For example, one or multiple of the connections may be changed at the communications network site or MIMO configurations at the site may be changed. In some instances, no changes may be needed such as indicated by the status report illustrated in FIG. 4. The method 300 ends in a step 390.

FIG. 4 illustrates an example of a status report that is displayed on a screen of a mobile testing device. The status report of FIG. 4 is a display table 400 that indicates the status of a cross connect, MIMO, or sector swap condition at each sector of a communications network site. The display table 400 can be pre-defined and pushed to the mobile testing device for display. The display table 400 is also provided to a screen of the shakedown server for display. The shakedown server, such as presented in FIG. 1 or FIG. 2, can select which display table is needed from a set of pre-defined tables that correspond to the results of the comparison of the depth and spread data to the pre-defined scenarios for the different conditions. As noted above, display table 400 corresponds to the scenario example above where there is no sector swap, cross connect, or MIMO issues. In one embodiment, there are twelve display tables that are pre-defined to correspond to different results of the comparison of the depth and spread data to the pre-defined scenarios for the different conditions. An additional display table can also be established for comparison situations where more additional review is required.

While the methods disclosed herein have been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

The above-described systems and methods or at least a portion thereof may be embodied in or performed by various processors, such as digital data processors or computers, wherein the computers are programmed or store executable programs or sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods or functions of the system described herein.

Certain embodiments disclosed herein may further relate to computer storage products with a non-transitory computer-readable medium that have program code thereon for performing various computer-implemented operations that embody at least part of the apparatuses, the systems or carry out or direct at least some of the steps of the methods set forth herein. Non-transitory medium used herein refers to all computer-readable media except for transitory, propagating signals. Examples of non-transitory computer-readable medium include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

What is claimed is:

1. A network test system for performing site acceptance testing for a communications network site having sectors, comprising:
    a mobile testing device configured to collect RF data from the communications network site and device location data corresponding to the RF data; and
    a shakedown server configured to receive the RF data and device location data from the mobile testing device, derive depth data and spread data of each sector based on the RF data and device location data, automatically determine a MIMO issue at the communications network site based on a comparison of the depth and spread data to pre-defined scenarios, and automatically determine a cross connect issue based on the comparison.

2. The network test system as recited in claim 1 wherein the shakedown server is further configured to send results of the automatically determined MIMO issue to the mobile computing device.

3. The network test system as recited in claim 1 wherein the shakedown server is further configured to receive site parameters about the communications network site and additionally employ the site parameters to automatically determine the existence of a MIMO issue at the communications network site.

4. The network test system as recited in claim 2 wherein the shakedown server includes a unique display table for each of the pre-defined scenarios to represent the results.

5. The network test system as recited in claim 1 wherein the mobile testing device is a smartphone.

6. The network test system as recited in claim 1 wherein the shakedown server employs RF data that includes device location data, cell ID, PCI, TB0 and TB1 to determine the MIMO issue.

7. The network test system as recited in claim 6 wherein the shakedown server further employs site location data, sector azimuth, sector beam width, and PCI data from site parameters to determine the MIMO issue.

8. The network test system as recited in claim 1 wherein the shakedown server employs RF data that includes device location data, cell ID, PCI, TB0 and TB1, to determine the cross connect issue.

9. The network test system as recited in claim 8 wherein the shakedown server further employs site location data, sector azimuth, sector beam width, and PCI data from site parameters to determine the cross connect issue.

10. The network test system as recited in claim 1 wherein the shakedown server is further configured to determine a sector swap at the communications network site based on site location data, sector azimuth, sector beam width, and PCI data from site parameters, and device location data, cell ID, and PCI data from the RF data.

11. A method of performing site acceptance testing for a communications network site, comprising:
    collecting RF data and device location data by a mobile testing device during a test drive around the communications network site;
    receiving the RF data, device location data, and site parameters of the communications network site at a shakedown server;
    automatically determining a MIMO status at the communications network site based on a comparison of the RF data, device location data, and site parameters to pre-defined scenarios for MIMO errors, and
    sending a status report to the mobile testing device based on the automatically determining, wherein the status report is a unique display table that corresponds to only one of the pre-defined scenarios.

12. The method as recited in claim 11 further comprising changing a connection or configuration at the communications network site based on the MIMO status.

13. The method as recited in claim 11 further comprising generating spread data and depth data from the RF data, the device location data, and the site parameters and automatically determining a MIMO status based on a comparison of the spread data and the depth data to the pre-defined scenarios.

14. The method as recited in claim 13 wherein the automatically determining includes comparing at least some data elements of the spread and depth data to established thresholds of the pre-determined scenarios.

15. The method as recited in claim 14 wherein each of the pre-determined scenarios includes a different combination of the data elements that are employed for comparison to the established thresholds.

16. A computer program product stored on a non-transitory computer readable medium that is configured to direct a processor of a mobile testing device to test a communications network site by performing a method, comprising:
   locking the mobile testing device to a single channel of the communications network site;
   collecting RF data from the communications network site and device location data corresponding to the RF data; and
   sending the RF data and the device location data to a server configured to automatically determine a MIMO, a cross connect, and a sector swap issue at the communications network site based on the RF data and site parameters of the communications network site.

17. The computer program product as recited in claim 16 wherein the method further comprises receiving a display table from the server that uniquely corresponds to MIMO, cross connect, or sector swap status of the communications network site.

18. A network test system for performing site acceptance testing for a communications network site having sectors, comprising:
   a mobile testing device configured to collect RF data from the communications network site and device location data corresponding to the RF data; and
   a shakedown server configured to receive the RF data and device location data from the mobile testing device, derive depth data and spread data of each sector based on the RF data and device location data, and automatically determine a MIMO issue at the communications network site based on a comparison of the depth and spread data to pre-defined scenarios, wherein the shakedown server employs RF data that includes device location data, cell ID, PCI, TB0 and TB1 to determine the MIMO issue.

19. A network test system for performing site acceptance testing for a communications network site having sectors, comprising:
   a mobile testing device configured to collect RF data from the communications network site and device location data corresponding to the RF data; and
   a shakedown server configured to receive the RF data and device location data from the mobile testing device, derive depth data and spread data of each sector based on the RF data and device location data, and automatically determine a MIMO issue at the communications network site based on a comparison of the depth and spread data to pre-defined scenarios, wherein the shakedown server is further configured to determine a sector swap at the communications network site based on site location data, sector azimuth, sector beam width, and PCI data from site parameters, and device location data, cell ID, and PCI data from the RF data.

* * * * *

UNITED STATES PATENT AND TRADEMARK OFFICE
CERTIFICATE OF CORRECTION

PATENT NO. : 10,084,673 B1
APPLICATION NO. : 15/590746
DATED : September 25, 2018
INVENTOR(S) : Gayatri Sirure and Manik Arora Page 1 of 1

It is certified that error appears in the above-identified patent and that said Letters Patent is hereby corrected as shown below:

In the Specification

In Column 8, Line 56, delete:
"Starting Sector Beamwidth=Sector Azimuth(Sector Beamwidth/2)"
And insert:
--Starting Sector Beamwidth=Sector Azimuth–(Sector Beamwidth/2)--

In Column 10, Lines 53-55, delete:
"PCI1 for A Beamwidth %=(Count of PCI1 for A Beamwidth)/Total count of PCI1=(45/45+5+25+30)=(45/105)=42.85~42.9"
And insert:
--PCI 1 for A Beamwidth % = (Count of PCI 1 for A Beamwidth)/ Total count of PCI 1 = (45/45+5+25+30)=(45/105)= 42.85 ~ 42.9--

Signed and Sealed this
Thirteenth Day of November, 2018

Andrei Iancu
*Director of the United States Patent and Trademark Office*